April 15, 1924.  1,490,082

F. O. BALL

PIPE COUPLING

Filed April 28, 1922

Frederick O. Ball Inventor

By ........ Attorney

Patented Apr. 15, 1924.

1,490,082

UNITED STATES PATENT OFFICE.

FREDERICK O. BALL, OF DETROIT, MICHIGAN.

PIPE COUPLING.

Application filed April 28, 1922. Serial No. 557,029.

*To all whom it may concern:*

Be it known that I, FREDERICK O. BALL, a citizen of the United States, residing at Detroit, in the county of Wayne and State of Michigan, have invented new and useful Improvements in Pipe Couplings, of which the following is a specification.

This invention is designed to make a tight joint, particularly such joints as are used for connections of pipes carrying gasoline such as are commonly used on automobiles and under similar conditions. As is well known it is very difficult to make a joint which may be quickly and conveniently assembled and which will assure a tight joint as against gasoline. It is preferable also to make such joints so that they may be taken apart and re-assembled with an assurance of a tight joint on the reassembling. The present invention is designed to form such a joint.

The invention is illustrated in the accompanying drawings as follows:—

Figure 1:
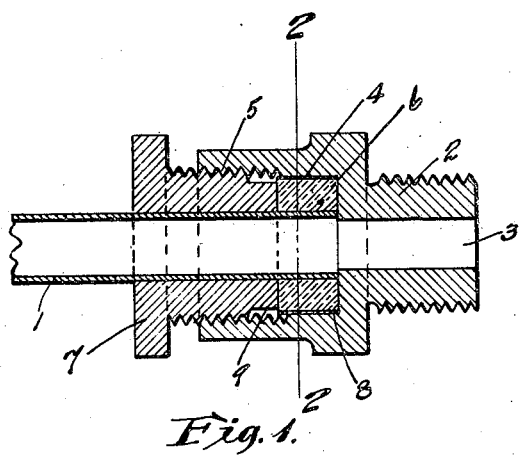

Fig. 1 shows a central section through the joint.

Figure 2:
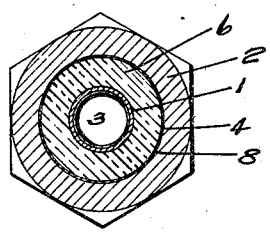

Fig. 2 a section on the line 2—2 in Fig. 1.

1 marks the pipe forming part of the gasoline connection, and 2 a fitting to which it is desired to connect the pipe, the fitting having a passage 3 in continuation of the pipe. A socket 4 is formed in the fitting 2. This is screw-threaded at 5. A packing 6 is placed in the socket and a pressure member 7 is screwed into the screw-threads 5 against the packing 6.

The packing 6 is formed of soft metal, such as Babbitt metal, and this under pressure flows so as to close any indenture and particularly a longitudinal scratch on the pipe. It also flows so as to make a perfect joint with the bottom of the socket 4. The use of such a metal for such a joint arises from the difficulty in removing it as the flowing of the metal would ordinarily expand it into engagement with the walls of the socket 4 and the slightly uneven surface of such wall would prevent the ready removal of the packing.

In my invention, therefore, I surround the packing with a shell 8 of thin steel, or comparatively hard material. The compression member has a cylindrical extension 9 which can follow into this shell in compressing the packing. This shell makes a fairly close sliding fit with the socket so that when the packing is subjected to pressure its expansive pressure will expand the shell against the walls of the socket thus assisting in the closure. When, however, this pressure is removed this shell is sufficiently elastic to contract slightly so as to permit of the ready removal of the packing as a whole. The packing is formed with the Babbitt metal and shell as a unit.

Different arrangements of the fitting and the compression socket may be used.

What I claim as new is:—

1. In a pipe coupling, the combination of a fitting having a joint socket; a packing of comparatively soft metal having a pipe opening therein; an annular hard elastic metal shell surrounding the soft metal packing between the packing and the wall of the socket; and a compression member acting on the packing to seal the joint, said compression member expanding the soft metal and through its expansive pressure expanding the shell into contact with the wall of the socket, said surrounding shell having sufficient elasticity with relation to the soft metal to contract through its elasticity when pressure is released by the compression member to loosen the shell from the walls of the socket whereby the packing may be removed from the socket.

2. A joint packing of comparatively soft metal having a pipe receiving opening therein encased in a surrounding shell of hard elastic metal, said shell having sufficient elasticity to expand under pressure exerted by a compression of the soft metal and to retract against the inherent resistance of the soft metal when pressure on the soft metal is released.

In testimony whereof I have hereunto set my hand.

FREDERICK O. BALL.